United States Patent
Balcerak et al.

(10) Patent No.: US 8,585,422 B2
(45) Date of Patent: Nov. 19, 2013

(54) SYSTEM FOR CONNECTING MOTOR DRIVES

(75) Inventors: John A. Balcerak, Muskego, WI (US); Thomas H. Van Groll, Cedarburg, WI (US); Craig R. Winterhalter, Cedarburg, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 110 days.

(21) Appl. No.: 13/267,477

(22) Filed: Oct. 6, 2011

(65) Prior Publication Data
US 2012/0264317 A1 Oct. 18, 2012

Related U.S. Application Data

(60) Provisional application No. 61/476,076, filed on Apr. 15, 2011.

(51) Int. Cl.
*H01R 13/64* (2006.01)
(52) U.S. Cl.
USPC .............. 439/249; 439/215; 439/59; 439/792
(58) Field of Classification Search
USPC ................... 439/215, 59, 792, 249
See application file for complete search history.

(56) References Cited

U.S. PATENT DOCUMENTS

| | | | | |
|---|---|---|---|---|
| 4,195,194 A | * | 3/1980 | Kuster et al. | 174/59 |
| 4,423,917 A | * | 1/1984 | Scheingold et al. | 439/249 |
| 5,024,627 A | * | 6/1991 | Bennett et al. | 439/631 |
| 5,073,120 A | * | 12/1991 | Lincoln et al. | 439/92 |
| 5,203,724 A | * | 4/1993 | Casey | 439/792 |
| 5,252,086 A | * | 10/1993 | Russell et al. | 439/215 |
| 5,670,743 A | * | 9/1997 | Welch et al. | 174/377 |
| 7,527,523 B2 | * | 5/2009 | Yohn et al. | 439/564 |
| 7,905,737 B2 | * | 3/2011 | Byrne | 439/215 |
| 2010/0062627 A1 | * | 3/2010 | Ambo et al. | 439/189 |

OTHER PUBLICATIONS

TYCO Electronics, Crown Clip Junior, Catalog 1654261-8, Sep. 2008.
TYCO Electronics, 114-19128, Dec. 2010.

* cited by examiner

*Primary Examiner* — Truc Nguyen
(74) *Attorney, Agent, or Firm* — R. Scott Speroff; Boyle Fredrickson, S.C.; John M. Miller

(57) ABSTRACT

A system for connecting motor drives to each other is disclosed that does not require the use of wire or tools. The system includes an adapter plug and bus bar modules that connect to each other at a conductive receptacle of the adapter plug to define a splice joint at the point of connect of the bus bar modules. The bus bar modules may include insulating covers and insulating clips may overlie the splice joints so that the system is substantially devoid of exposed surfaces of its conductive materials.

15 Claims, 5 Drawing Sheets

SYSTEM FOR CONNECTING MOTOR DRIVES

CROSS-REFERENCE TO RELATED APPLICATIONS

This application claims priority to U.S. Provisional Application No. 61/476,076 filed Apr. 15, 2011, the entire contents of which are incorporated herein by reference.

BACKGROUND OF THE INVENTION

The subject matter disclosed herein relates to electrical conductors that connect electronic components to each other and, more particularly, to wiring systems for connecting servo motor drives to each other within servo motor drive systems.

Servomotors provide a motor coupled to a sensor, for example, a position sensor such as an encoder, so that feedback control of the motor may be provided, for example, precise positioning control. Typically, a servo motor drive system provides a servo motor, for example, a DC permanent magnet motor and position encoder, which is wired to a servo drive. The servo drive provides a controllable source of DC power as controlled by a feedback signal from the position encoder by, for example, using a PID (proportional-integral-derivative) motor control algorithm.

The servo drive may be installed in an equipment cabinet to receive the source of DC power. When multiple servo drives are required, this source of DC power is independently wired to each of the servo drives, for example, using terminal blocks and/or standard electrical connectors with pins or blades engaging corresponding sockets. Power has been delivered to printed circuit boards through bus bars that engage connectors that are soldered or screwed to the printed circuit boards.

BRIEF DESCRIPTION OF THE INVENTION

The inventors have recognized that wiring electronic components such as, for example, motor drives to each other can take substantial amounts of time. The inventors have also recognized that different end-use implementations of industrial controls may require highly skilled technicians to assemble motor drives because such end-use implementations tend to differ from each other and may require, for example, using numerous conductors that have to be cut to length to make numerous wire-based "daisy-chain"-type or other sequential connections to interconnect the motor drives. The inventors have further recognized that bus bar based connecting systems typically include bus bar receptacles that have to be soldered or screwed to printed circuit boards, which may take substantial amounts of time to install. The inventors have yet further recognized that the bus bars of such connecting systems present exposed conductive surfaces having relatively large surface areas and that are in locations of motor drive housings that may be subjected to airborne particulate matter which may dirty the electrical contacts and compromise conductivity, and that bus bars of such connecting systems may also be in locations of motor drives housings that may be accessed later by technicians with tools, which may inadvertently produce short circuit conditions by contacting the exposed bus bars. The present invention contemplates a bus bar connector system that addresses various ones of these and other inventor-identified problems and drawbacks of known systems.

In accordance with an aspect of the invention, a bus bar connector system is provided for removably connecting at least two electronic components to each other. The system may include a bus bar module having a bus bar with a first blade having a first exposed conductive surface(s) for connecting to a first electronic component and a second blade having a second exposed conductive surface(s) for connecting to a second electronic component. The bus bar may have a covered segment that extends between the first and second blades. An insulating cover may be connected to the bus bar and extend over the covered segment of the bus bar. A clip may engage the bus bar module and be movable between at least first and second positions. When the clip is in the first position, it may overlie at least one of the first and second blades or exposed conductive surfaces of the bus bar. When the clip is in the second position, it may be spaced from the first and/or second blades or exposed conductive surfaces of the bus bar. This may allow conductors within the bus bar connector system to be covered or non-exposed.

In accordance with another aspect of the invention, the insulating cover may include a pair of opposing side walls that extend over a pair of opposing side walls of the bus bar module. The clip side walls may slidingly engage the insulating cover side walls so that the clip can move longitudinally with respect to the bus bar module while being transversely guided upon the bus bar module. This may allow conductors within the bus bar connector system to be covered quickly during assembly.

In accordance with another aspect of the invention, the bus bar connector system includes first and second bus bar modules. The first and second bus bar modules may be connected to each other at a splice joint. The splice joint may include a conductive receptacle that holds respective ends of the first and second bus bar modules, so that their blades or exposed conductive surfaces contact the conductive receptacle so as to electrically connect the first and second bus bar modules to each other. The clip may cover the splice joint so that the covered surfaces of the bus bars of the first and second bus bar modules and the clip define a continuously covered length of the combination of the first and second bus bar modules and splice joint. This may allow bus bars to be quickly coupled to or uncoupled from each other which may facilitate connecting electronic components to each other while providing a connector system that has its conductive surfaces substantially covered with insulating materials.

In accordance with another aspect of the invention, the conductive receptacle may be provided in a plug housing of an adapter plug. The conductive receptacle may be provided at a first end of the adapter plug and a second end of the adapter plug may be operably coupled to a connector that is fixed to a printed circuit board of an electronic device. This may facilitate quickly connecting electronic devices to each other.

In accordance with another aspect of the invention, the clip may be slidably mounted to the first bus bar module and may be slidable over the plug housing and upon the second bus bar module, so that the clip covers the entire splice joint and overlaps portions of the first and second bus bar modules. A lock may be provided that prevents sliding movement of the clip with respect to the splice joint. The lock may include a lock projection and a cooperating lock receptacle on the clip and at least one of the adapter plug and first and second bus bar modules, which can engage each other to secure the clip in place when it covers the splice joint. This may allow the clip to remain in a position in which it covers the splice joint that connects bus bars to each other so that conductive materials of the splice joint remain unexposed or substantially covered with insulating materials.

In accordance with another aspect of the invention, each bus bar module may include a pair of bus bars that are transversely spaced and electrically insulated from each other. Each adapter plug may include a pair of connective receptacles that are transversely spaced from and insulated with respect to each other. This may facilitate simultaneously connecting positive and negative bus bars to electronic components which may simplify connecting such electronic components to each other by allowing multiple connections to be made in a single installation step.

In accordance with another aspect of the invention, the bus bar connector system may be implemented within an industrial control system and may connect multiple motor drives to each other. First, second, and third adapter plugs may be connected to first, second, and third motor drives of the industrial control system. A pair of bus bar modules may be longitudinally aligned with each other so that outer ends of the bus bar modules are connected to the first and third adapter plugs. Inner or inwardly positioned ends of the bus bar modules may be connected to each other at a spliced joint defined at the second adapter plug and a clip may extend over the splice joint. The bus bar connector system may include the same number of adapter plugs as the number of motor drives that are being connected and may include one fewer bus bar module than the number of motor drives and adapter plugs. This may facilitate connecting multiple motor drives to each other in a tool-less manner.

To the accomplishment of the foregoing and related ends, certain illustrative aspects of the disclosed innovation are described herein in connection with the following description and annex drawings. These aspects are indicative, however, of but a few of the various ways, in which the principles disclosed herein can be employed, as is intended to include all such aspects and their equivalents. Other advantages and novel features will become apparent from the following detailed description when considered in conjunction with the drawings.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
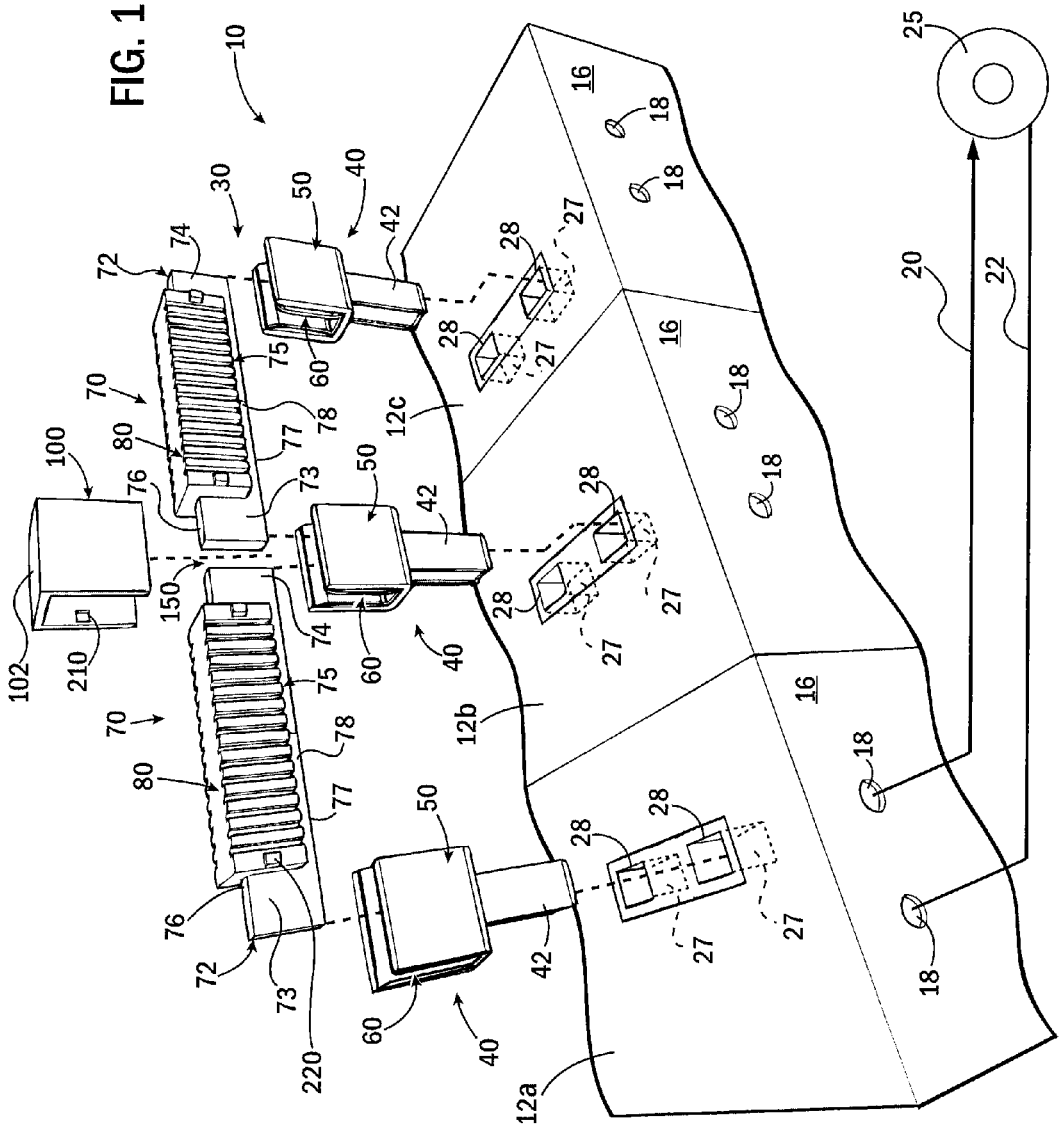
FIG. 1 is a simplified perspective view, partially exploded, of a system for connecting motor drives according to an aspect of the present invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected", "attached", or terms similar thereto are often used. They are not limited to direct connection but include connection through other elements where such connection is recognized as being equivalent by those skilled in the art.

DETAILED DESCRIPTION OF THE PREFERRED EMBODIMENTS

Figure 2:
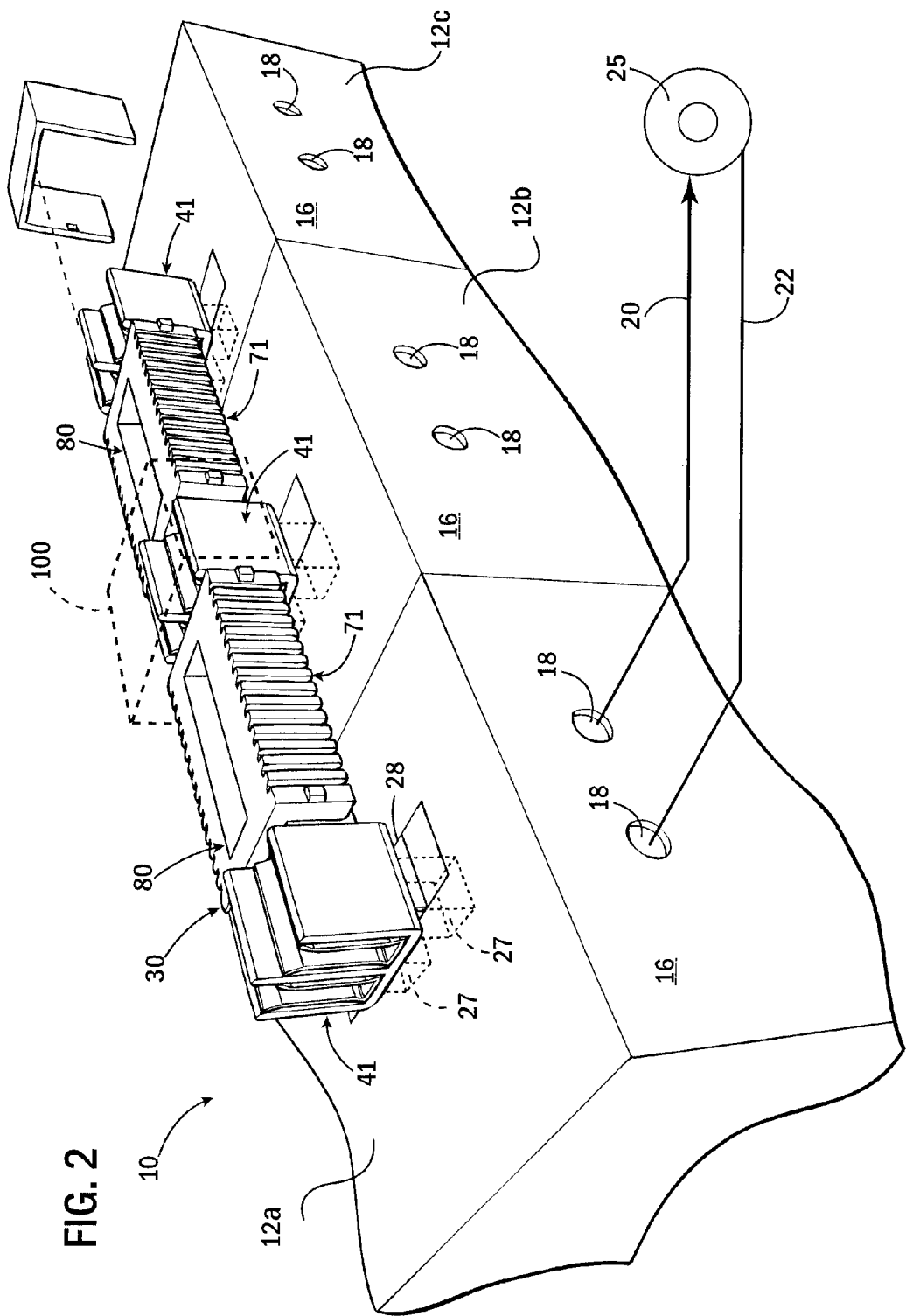
FIG. 2 is a simplified perspective view, partially exploded, of a variant of the system for connecting motor drives of FIG. 1.

Referring now to FIGS. 1 and 2, a bus bar connector system 30 is a modular system that electronically connects at least two, while allowing for connecting an arbitrary number of, electronic components to each other in a tool-less manner. The bus bar connector system 30 is described as being used in a servo motor drive system 10 to simplify its explanation, while noting that the bus bar connector system 30 in other embodiments may be implemented to interconnect various other electronic components to each other.

Still referring to FIGS. 1 and 2, a servo motor drive system 10 may provide for multiple drive modules 12a-12c each having generally rectangular housings 14 that may be mounted in a control cabinet or the like to be in side-by-side adjacent relationship with respect to each other. Rear vertical walls 16 of the housings 14 may include openings through which connectors 18 are accessible and to which power conductors 20 and signal conductors 22 may be connected. Power conductors 20 may deliver electrical power to windings of a servomotor 25 for energizing the servomotor. Signal conductors 22 may convey control signals between an encoder of the servomotor 25 and the drive modules 12a-12c so that the drive modules 12a-12c may control the servomotor 22 according to methods well known in the art.

Still referring to FIGS. 1 and 2, horizontal upper walls 26 of the drive modules housings 14 of this embodiment may present socket receptacles 28 of electrical connectors 27 that are flush mounted with the upper walls 26 of the drive modules 12a-12c. The electrical connectors 27 are operably connected to printed circuit boards of the drive modules 12a-12c for delivering electrical power to the drive modules 12a-12c.

Still referring to FIGS. 1 and 2, a bus bar connector system 30 is a modular system that interconnects the drive modules 12a-12c by wire-free daisy chain connections that can provide main power and/or control power to the drive modules 12a-12c. In one embodiment, the main power is 100 amp DC bus power and the control power is 16 amp, 24 volt control power, optionally, other values of main and control power, depending on the particular configurations of the drive modules 12a-12c. The modular configuration of the bus bar connector system 30 allows for drive modules 12a-12c to be added to or removed from the servo motor drive system 10, while making or removing the electrical interconnections between the drive modules 12a-12c in a tool-less manner.

Still referring to FIGS. 1 and 2, the bus bar connector system 30 includes adapter plugs 40, 41 and bus bar modules 70, 71 that cooperate with each other to make the tool-less electrical connections between the drive modules 12a-12c. Multiple adapter plugs 40, 41 and multiple bus bar modules 70, 71 may be provided within the bus bar connector system 30 so that an arbitrary number of parallel electrical conductive paths through chains of the bus bar modules 70, 71 in a manner that allows an arbitrary number of drive modules 12a-12c to be electrically connected to each other.

Figure 3:
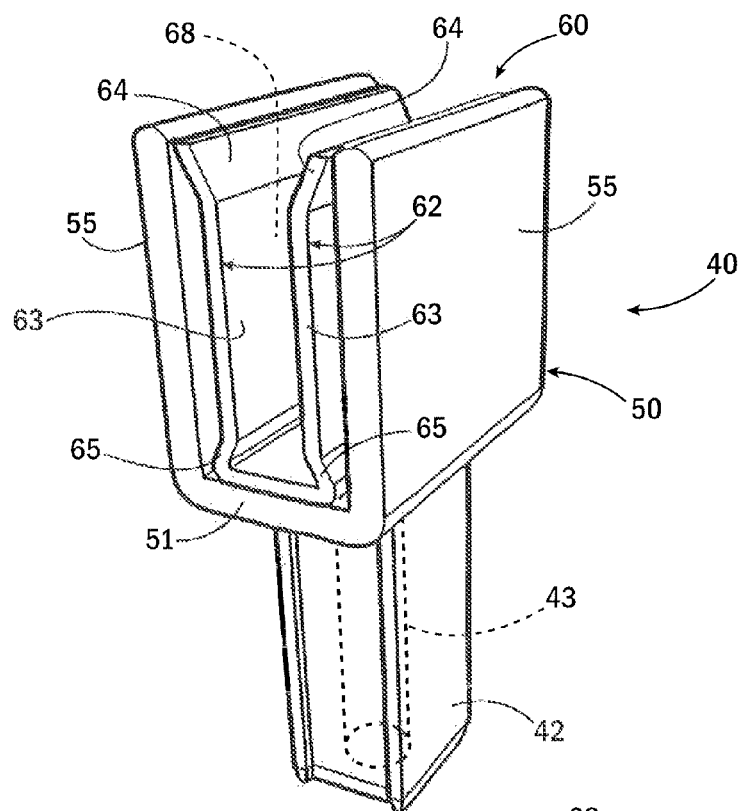
FIG. 3 is a pictorial view of an adapter plug of the system for connecting motor drives of FIG. 1.

Referring now to FIG. 3, adapter plug 40 has a plug leg 42 at a first end of the adapter plug 40 and that is made from a polymeric or other electrically insulating material. The plug leg 42 can be inserted, by hand, into the socket receptacle 28 of the electrical connector 27 of the printed circuit board of the drive module 12a-12c. When the plug leg 42 is inserted into the socket receptacle 28, a conductive pin 43 that extends longitudinally through the plug leg 42 couples to a cooperating conductor (not shown) within the socket receptacle 28. In this way, the adapter plug 40 and the electrical connector 27 are mechanically and electrically connected to each other.

Still referring to FIG. 3, at a second end of the adapter plug 40, a plug housing 50 that holds a conductive receptacle 60 is connected to an end of the plug leg 42. The plug housing 50 is made from a polymeric or other electrically insulating material and includes a bottom wall 51 that extends transversely with respect to and outwardly beyond the plug leg 42. A pair of side walls 55 extends upwardly from outer edges of the bottom wall 51, providing the plug housing 50 with a U-shaped configuration with openings at the top, front, and back. The conductive receptacle 60 is nested within the adapter plug 40 and is operably connected to the conductive pin 43 so that an electrically conductive path is defined through the conductive receptacle and pin 60, 43. The conductive receptacle 60 has a pair of opposing leaves 62 that are interconnected through a base strap 66. Each of the leaves 62 includes an intermediate segment 63 that extends between bent upper and lower ends 64, 65 that extend angularly from the intermediate segment.

Still referring to FIG. 3, at surfaces of the leaves 62 that face outwardly or toward the plug housing side walls 55, obtuse angles are defined at points of intersection between the bent upper and lower ends and the intermediate segment. Acute angles are defined at inwardly facing surfaces of the bent lower ends 65 of the leaves 62 and an upwardly facing surface of the base conductive receptacle base strap 66. A generally rectangular slot 68 is defined between the leaves 62 and base strap 66 and is configured to receive the bus bar module(s) 70 so that it is resiliently held between the leaves 62 of the conductive receptacle 60.

Figure 4:
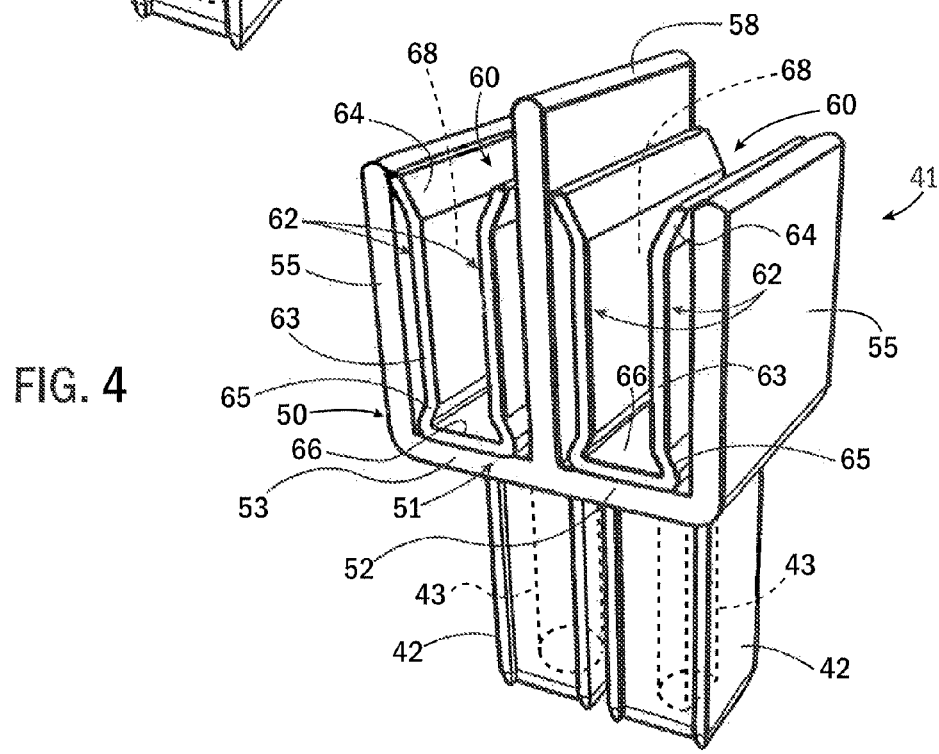
FIG. 4 is a pictorial view of an adapter plug of the system for connecting motor drives of FIG. 2.

Referring now to FIG. 4, adapter plug 41 of this embodiment is largely analogous to adapter plug 40 of FIG. 3, described above, only being configured as a unitized pair of adapter plugs. Accordingly, many of the parts of adapter plug 40 that are also in adapter plug 41 are not described here again with respect to adapter plug 41 because their descriptions above with respect to adapter plug 40 are also applicable here with respect to adapter plug 41.

Still referring to FIG. 4, adapter plug 41 includes a pair of plug legs 42 that extend downwardly from a plug housing 50 that holds a pair of conductive receptacles 60. The plug legs 42 are spaced from each other by a distance that corresponds to a distance between a pair of receptacles 28 of the electrical connectors 27 of the drive module 12a-12c. The electrical connectors 27 of the drive module 12a-12c may be positive and negative polarity connectors of the DC bus power system for the drive module 12a-12c. This may allow the adapter plug 41 to connect to both positive and negative polarity connectors of the DC bus power system and/or control power to the drive modules 12a-12c in a single installation step.

Still referring to FIG. 4, in this embodiment, the bottom wall 51 of adapter plug 41 defines a first segment 52 between one plug leg 42 and conductive receptacle 60 and a second segment 53 between a second plug leg 42 and corresponding conductive receptacle 60. An intermediate wall 58 extends from a point of intersection of the first and second bottom wall segments 52, 53 of the bottom wall 51. The intermediate wall 58 extends parallel to and is arranged between the side walls 55 and extends further away from the bottom wall 51 than the side walls 55. In this configuration, the intermediate wall 58 can support a middle portion of a clip 100 from below when the clip 100 is mounted over the plug housing 50, explained in greater detail elsewhere herein. The pair of conductive receptacles 60 is provided on opposing sides of the intermediate wall 58 so that intermediate wall 58 defines an insulating barrier between the pair of conductive receptacles 60 that receive and resiliently hold the bus bar module 71, similar to how the adapter plug 40 resiliently holds the bus bar module 70, as described in greater detail elsewhere herein.

Figure 5:
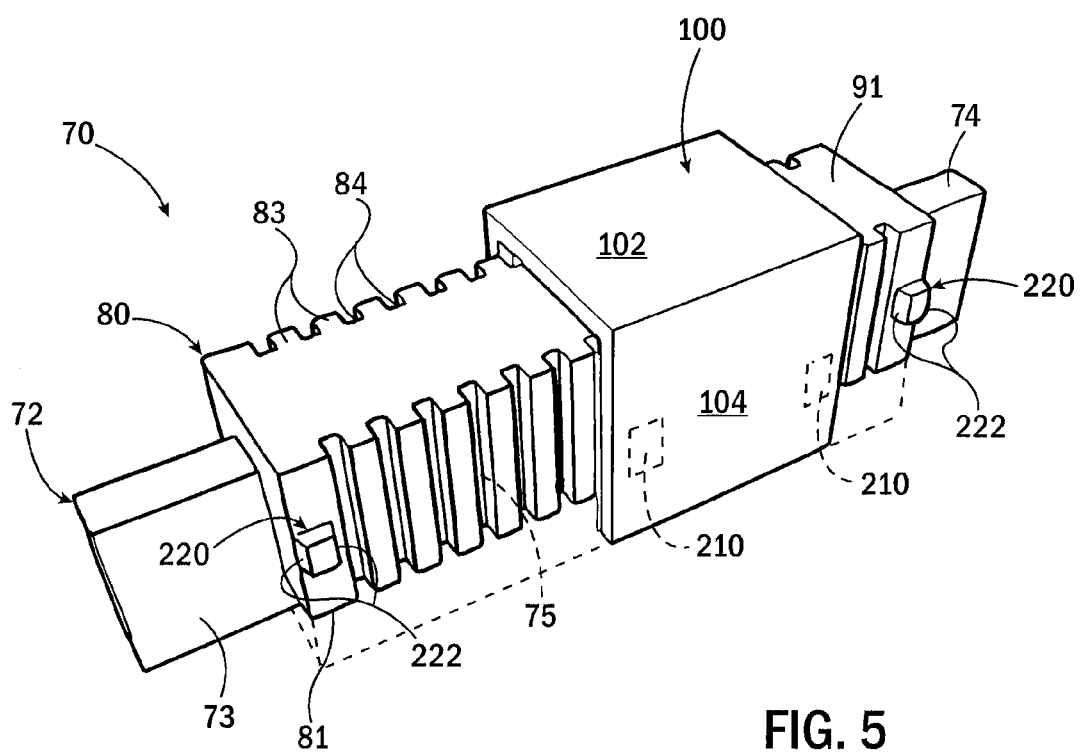
FIG. 5 is a pictorial view of a bus bar module of the system for connecting motor drives of FIG. 1.

Referring now to FIGS. 1 and 5, bus bar module 70 includes a bus bar 72 that is made from an electrically conductive metallic material and a cover 80 that is made from a polymeric or other insulating material. A clip 100 that is made from a polymeric or other insulating material is provided that engages the bus bar modules 70 and/or adapter plug 40 to selectively cover various surfaces of conductive materials, as described in greater detail elsewhere herein.

Still referring to FIGS. 1 and 5, bus bar 72 includes blades 73, 74 at opposing ends and a covered segment 75 that extends between and connects the blades 73, 74 to each other. In this embodiment, the blades 73, 74 and covered segment 75 are integral with each other so that a single piece of conductive material defines the bus bar 72. As shown in FIG. 1, in this embodiment, the covered segment 75 is covered on an upper wall 76 and on most of a pair of side walls 78 of the bus bar 72. A lower wall 77 and lower portions of the covered segment 75, for example, the lowermost 20 percent of a height of the covered segment 75, is exposed and facing toward the drive modules 12a-12c.

Referring now to FIG. 5, cover 80 includes a lower wall 81 and a pair of side walls 82 that extend downwardly from outer perimeter edges of the lower wall 81. In this embodiment, the side walls 82 include alternating ribs 83 and grooves 84 that define gripping surfaces 85 on the cover 80 that can be grasped by fingers of a user and that may facilitate tool-less insertion and removal of the bus bar module 70 into and from the adapter plug 40. A lower wall 87 extends between lower edges of the side walls and channel 88 extends upwardly through lower wall 87 toward the upper wall 91.

The channel 88 extends longitudinally through the entire cover 80 and is configured to receive the bus bar 72 so that the cover engages and overlies the covered segment 75 of the bus bar 72. In one embodiment, cover 80 is press or friction fit to the bus bar 72. In one embodiment, the cover 80 is adhered or bonded to the bus bar 72 with suitable adhesive and/or bonding agents, well known to those skilled in the art. In another embodiment, the cover 80 extends around the entire perimeter of the bus bar 72 at the covered segment 75, so that the blades 73, 74 are the only exposed conductive surfaces of the bus bar 72. This can be seen in FIG. 5 as the cover 80 and phantom outline extension that continues around the lower wall 77 of the bus bar 72. In such embodiment, the cover 80 can include upper and lower segments, or other cooperating segments, segments that snap-fit with each other to completely surround the covered segment 75 of the bus bar 72. Or, the cover 80 and/or cover components can be implemented as a single unitary piece that is applied to the bus bar 72 in an overmolding procedure.

Figure 6:
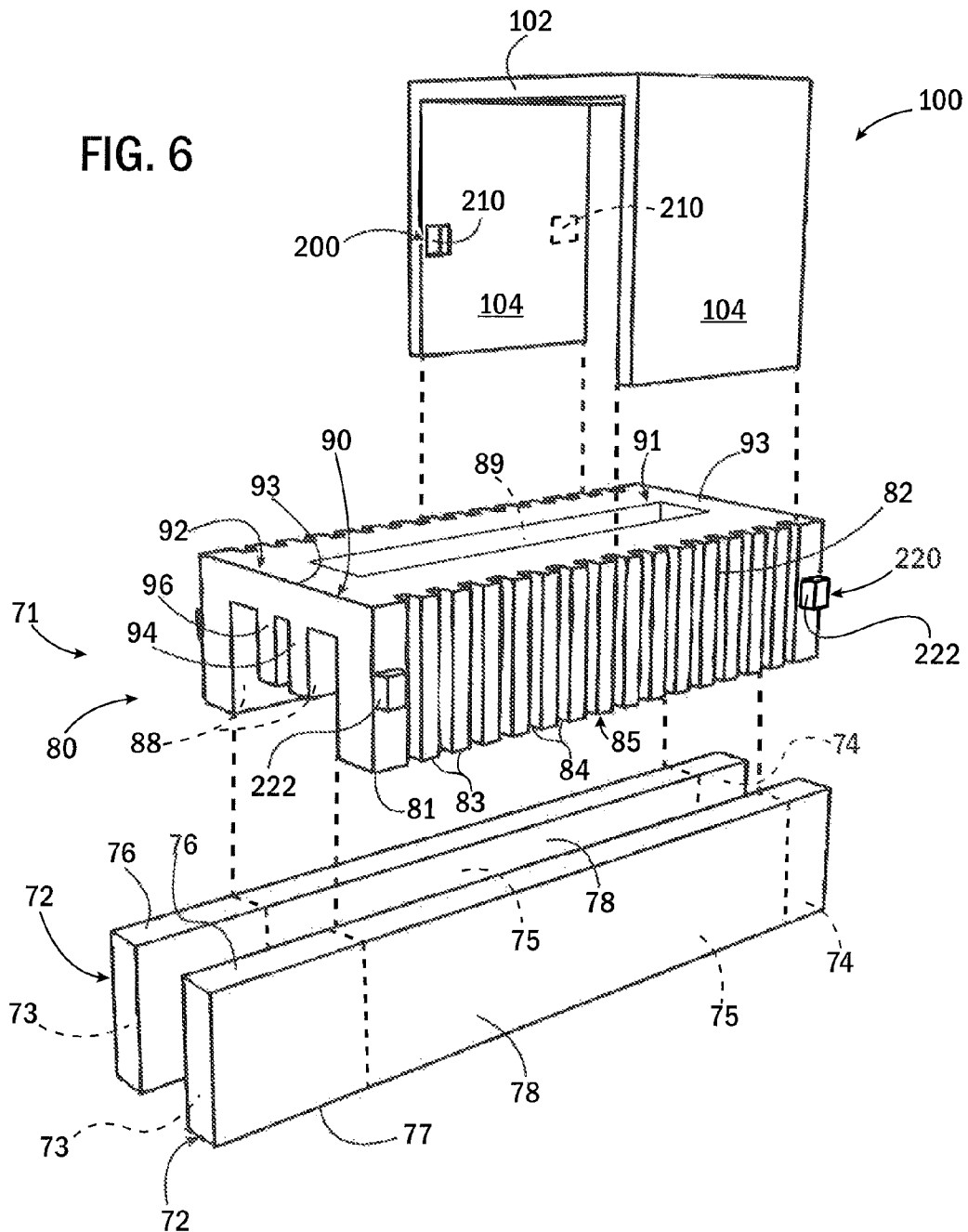
FIG. 6 is a pictorial view of a variant of a bus bar module of the system for connecting motor drives of FIG. 2.

Referring now to FIG. 6, bus bar module 71 of this embodiment is largely analogous to bus bar module 70 of FIG. 5, described above, only being configured as including a pair of bus bars 72. Accordingly, many of the parts of bus bar module 70 that are also in bus bar module 71 are not described here again with respect to bus bar module 71 because their descriptions above with respect to bus bar module 70 are also applicable here with respect to adapter plug 71.

Still referring to FIG. 6, bus bar module 71 includes a pair of bus bars 72 and a cover 80. Cover 80 of this embodiment includes first and second segments 90, 92 that hold the pair of bus bars 72. The first and second segments 90, 92 are defined on opposing sides of a longitudinally extending centerline of the cover 80. A pair of intermediate walls 94, 96 that are spaced from each other extends from the lower wall 81 and are parallel to and are positioned between the side walls 82. An opening 89 extends through the upper wall 91, between the intermediate walls 94, 96 so that a pair of arms 93 are defined at opposing ends of the upper wall 91 that connect the first and second segments 90, 92 to each other.

Still referring to FIG. 6, a pair of channels 88 is defined between (i) the intermediate wall 94 and an adjacent side wall 82, and (ii) the intermediate wall 96 and the other side wall 82. The pair of bus bars 72 is mounted in the pair of channels 88 by press or friction fit, adhesion, bonding, or overmolding so that each of the first and second segments 90, 92 extends over a majority or an entirety of the covered segment 75 of the respective bus bar 72.

Referring again to FIGS. 1 and 2, a chain(s) of bus bar modules 70, 71 that interconnects the drive modules 12a-12c is defined by multiple bus bar modules 70, 71 that are longitudinally aligned and electrically connected to each other at a splice joint 150. The splice joint 150 includes the adjacent blades 73, 74 of an aligned pair of adjacent bus bars 72 that are both held between the leaves 62 of the conductive receptacle(s) 60 of the adapter plug 40, 41. In the splice joint 150, each of the blades 73, 74 extends about halfway along the length of the slot 68. End surface of the covers 80 of the bus bar modules 70, 71 that face each other can abut corresponding end surfaces at opposing sides of the plug housing 50 which may help secure the bus bar modules 70, 71 in a longitudinal direction within the adapter plugs 40, 41.

Referring now to FIGS. 5 and 6, clip 100 is made from a polymeric or other electrically insulating material and includes an upper wall 102 and a pair of side walls 104 that extends downwardly from opposing side edges of the upper wall 102. As shown in FIGS. 1 and 2, the clip 100 is long enough so that once the clip 100 is installed over the splice joint 150, it extends entirely over the blades 73, 74 and over parts of the covers 80 of the adjacent bus bar modules 70, 71 that are connected to each other at the splice joint 150. A distance between the clip side walls 104 corresponds to a width of the adapter plug housing 50 and bus bar cover 80. This provides the clip 100 with an upside-down U-shape configuration that can fit over the adapter plug 40, 41 and/or bus bar modules 70, 71 for selectively covering the splice joint(s) (FIGS. 1 and 2) by either vertically inserting the clip 100 from above the splice joint 150 or by sliding the clip 100 horizontally across the splice joint 150. When the clip 100 is slid over across the splice joint 150, the plug housing 50 and bus bar covers 80 that nest inside and slide within the clip 100 guide the travel of the clip 100 as it travels across the splice joint 150. In one embodiment, bottom portions of the clip side walls 104 include lips or rails (not shown) that extend inwardly toward each other, across the clip 100 and such lips or rails engage the lower walls 87 of the bus bar cover 80 and plug housing bottom wall 51 of the adapter plug 40, 41 while the clip 100 slides thereupon.

Referring again to FIGS. 1 and 2, a lock 200 includes a lock receptacle 210 that extends into inwardly facing surfaces of the clip side walls 104 and lock projections 220 that extend outwardly from the bus bar cover side walls 82. The lock projections 220 include ramped surfaces 222 that slant toward the side walls 82 and so that when the clip 100 is slid across to cover the splice joint 150, the clip side walls 104 are deflected outwardly from each other until the lock receptacle 210 overlies the lock projection 220, at which point the clip side walls 104 restore inwardly and the lock projection 220 is held within the lock receptacle 210. In one embodiment, the lock receptacles 210 extend into the bus bar side walls 82 and the lock projections 220 extend into the clip side walls 104. In another embodiment, one bus bar side wall 82 has a lock receptacle 210 and the second bus bar side wall 82 has a lock projection 220, whereas the corresponding clip side walls 104 have the other ones of the lock receptacle and projections 210, 220.

In light of the above, using the bus bar connector system 30 allows a user to electrically interconnect multiple drive modules 12a-12c, without using wires or tools. The adapter plugs 40, 41 are pressed into the electrical connectors 27 that are attached to the printed circuit boards of the drive modules 12a-12c. The bus bar modules 70, 71 are then pressed into the adapter plugs 40, 41, so that the blades 73, 74 of the bus bars 72 are squeezed between the leaves 62 of the conductive receptacles 60. This connects the blades 73, 74 that are being held within a common conductive receptacle 60 to each other, at a splice joint 150. The splice joint 150 is encapsulated between the adapter plug housing 50 and a clip 100 by locking the clip 100 over the splice joint 150. This may be done by, for example, pushing the clip 100 over the adapter plug housing 50, vertically from above. Or the clip 100 may be pushed onto a first cover 80 of a first bus bar module 70, 71. The clip 100 is slid over the splice joint 150 so that the lock receptacles 210 of the clip side walls 104 engage lock projections 220 of bus bar cover side walls 82 of a second cover 80 of a second bus bar module 70, 71 that is being joined to the first bus bar module 70, 71 through the splice joint 150. This is repeated as many times as necessary to connect the desired number of drive modules 12a-12c or other electronic components to each other. Such procedures may be performed in a reverse order to disconnect the modules 12a-12c or other electronic components from each other in a tool-less manner. This provides an easy to assemble and disassemble chain of spliced-together bus bars 72 with substantially no exposed electrically conductive materials or surfaces, for example, more than about 70 percent and preferably more that about 80 percent of the electrically conductive materials of the bus bar connector system 30 being covered by the insulating materials of the covers 80, plug housing 50, and clips 100.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A bus bar connector system for removably connecting at least two electronic components to each other, comprising,
   a bus bar module that includes
      a bus bar with a first blade for connecting to a first electronic component, a second blade for connecting to a second electronic component, and a covered segment extending between and connecting the first and second blades;
   a cover that is made from an insulating material and that is connected to the bus bar and extends over the covered segment of the bus bar; and
   a clip that engages the bus bar module and is movable between at least first and second positions, such that the clip in the first position overlies at least one of the first and second blades of the bus bar, and the clip in the second position is spaced from the at least one of the first and second blades of the bus bar;

wherein the bus bar module is a first bus bar module and the system includes,
a second bus bar module having a blade and a covered surface that extends from the blade, and
a splice joint defined between the first and second bus bar modules and that includes a conductive receptacle that holds respective blades of the bus bars of the first and second bus bar modules adjacent to each other, and wherein the clip is made from an insulating material and covers the splice joint so that the covers of the first and second bus bar modules and the clip define a continuously insulated covered length of the combination of the first and second bus bar modules and the splice joint.

2. The bus bar connector system of claim 1, the cover further comprising a pair of opposing side walls that extends over a pair of opposing side walls of the bus bar and the clip engages and is longitudinally movable with respect to the opposing side walls of the cover.

3. The bus bar connector system of claim 1, wherein the bus bar module includes first and second bus bars that are transversely spaced from each other, the cover extending between and connecting the first and second bus bars to each other while electrically insulating the first and second bus bars from each other.

4. The bus bar connector system of claim 3, wherein the cover includes a first segment that extends over the covered surface of the first bus bar, a second segment that is transversely spaced from the first segment and extends over a covered surface of the second bus bar, and at least one arm that extends between and connects the first and second segments of the cover to each other.

5. The bus bar connector system of claim 3, further comprising an adapter plug that includes a plug housing and a pair of conductive receptacles that are provided in the housing and are insulated from each other, the first and second bus bars of the bus bar module being removably connected to the pair of conductive receptacles of the adapter plug such that the pair of conductive receptacles and first and second bus bars of the bus bar module define two separate paths of electrical conductivity therethrough.

6. The bus bar connector system of claim 1, further comprising an adapter plug that includes a plug housing to which the conductive receptacle is mounted so that the splice joint is defined within the plug housing.

7. The bus bar connector system of claim 6, wherein the clip is slidably mounted to the first bus bar module and a portion of the clip can slide beyond the first bus bar module and the plug housing so as to engage a lock on the second bus bar module that prevents sliding movement of the clip with respect to the splice joint.

8. A bus bar connector system, comprising:
an adapter plug that includes a plug housing and a conductive receptacle mounted to the plug housing;
a first bus bar module that includes a bus bar having a first blade that engages the conductive receptacle of the adapter plug;
a second bus bar module that includes a bus bar having a second blade that engages the conductive receptacle of the adapter plug so that a splice joint is defined at the adapter plug, the splice joint connecting the first and second bus bar modules to each other so that the bus bars of the first and second bus bar modules are in electrical communication with each other;
a clip that engages at least one of the adapter plug, the first bus bar module, and the second bus bar module, the clip overlying the splice joint so that the splice joint is enclosed between the clip and the adapter plug;

further comprising a first cover that is made from an insulating material and that extends over at least a portion of the first bus bar and a second cover that is made from an insulating material and that extends over at least a portion of the second bus bar;
wherein the chip is made from an insulating material and first and second covers of the first and second bus bar modules extend at least partially under the clip and the blades of the first and second bus bar modules are enclosed between the clip and the adapter plug; and
wherein the first and second covers and the plug housing have corresponding widths so that the clip can engage and slide between the first and second bus bar modules and the adapter plug.

9. The bus bar connector system of claim 8, further comprising a lock securing the clip over the splice joint, the lock including one of a lock projection and a lock receptacle provided on the clip and the other one of a lock projection and a lock receptacle on one of the adapter plug, the first bus bar module, and the second bus bar module.

10. The bus bar connector system of claim 8, wherein each of the first and second bus bar modules includes a pair of bus bars that are transversely spaced and electrically insulated from each other.

11. The bus bar connector system of claim 10, further comprising a cover that is made from an insulating material and that connects the pair of bus bars to each other and at least partially covers the pair of bus bars within each of the first and second bus bar modules.

12. The bus bar connector system of claim 11, wherein the cover includes a pair of opposing side walls that engage a pair of opposing inwardly facing surfaces of the clip.

13. The bus bar connector system of claim 12, wherein the opposing inwardly facing surfaces of the clip are defined on a pair of side walls of the clip, the clip further including an upper wall that extends between and connects the side walls of the clip to each other, and wherein the upper wall of the clip extends over exposed conductive surfaces of the first and second bus bars and the conductive receptacle of the adapter plug.

14. A bus bar connector system for connecting multiple motor drives to each other, comprising:
a first adapter plug that can connect to a first motor drive and that includes a first conductive receptacle;
a second adapter plug that can connect to a second motor drive and that includes a second conductive receptacle;
a third adapter plug that can connect to a third motor drive and that includes a third conductive receptacle;
a pair of bus bar modules that are longitudinally aligned with each other so that a pair of outwardly positioned ends of the pair of bus bar modules are connected to the first and third adapter plugs and a pair of inwardly positioned ends of the pair of bus bar modules are connected to each other at a splice joint defined at the second adapter plug, the splice joint holding the pair of inwardly positioned ends of the pair of bus bar modules in longitudinally adjacent alignment with each other, so that the pair of bus bar modules interconnect the first motor drive, the second motor drive, and the third motor drive with each other; and
a clip that overlies the splice joint.

15. The bus bar connector system of claim 14, wherein each of the bus bar modules includes a bus bar having a cover that is made from an insulating material and that extends between the respective inwardly and outwardly positioned ends of the bus bar modules.

* * * * *